(12) United States Patent
Bao et al.

(10) Patent No.: US 10,250,702 B2
(45) Date of Patent: Apr. 2, 2019

(54) METHOD AND APPARATUS FOR PUSHING INFORMATION

(71) Applicant: Xiaomi Inc., Beijing (CN)

(72) Inventors: Song Bao, Beijing (CN); Xingsheng Lin, Beijing (CN); Zhiyong Feng, Beijing (CN)

(73) Assignee: Xiaomi Inc., Beijing (CN)

( * ) Notice: Subject to any disclaimer, the term of this patent is extended or adjusted under 35 U.S.C. 154(b) by 305 days.

(21) Appl. No.: 15/224,056

(22) Filed: Jul. 29, 2016

(65) Prior Publication Data

US 2016/0337460 A1    Nov. 17, 2016

Related U.S. Application Data

(63) Continuation of application No. PCT/CN2015/078116, filed on Apr. 30, 2015.

(30) Foreign Application Priority Data

Dec. 11, 2014   (CN) .......................... 2014 1 0768152

(51) Int. Cl.
*G06F 15/16*   (2006.01)
*H04L 29/08*   (2006.01)
(Continued)

(52) U.S. Cl.
CPC ............ *H04L 67/18* (2013.01); *G08B 21/028* (2013.01); *G08B 21/0211* (2013.01);
(Continued)

(58) Field of Classification Search
CPC .............. G08B 21/0269; G08B 21/028; G08B 21/0211; H04W 4/029; H04W 4/021; H04L 67/26; H04L 67/18
See application file for complete search history.

(56) References Cited

U.S. PATENT DOCUMENTS 7,373,153 B2    5/2008   Daurensan
7,656,287 B2 *  2/2010   Albert ................. G06F 19/3418
                                                      340/521
(Continued)

FOREIGN PATENT DOCUMENTS

CN    101674525 A    3/2010
CN    202190318 U    4/2012
(Continued)

OTHER PUBLICATIONS

International Search Report and Written Opinion (including English translation) issued in corresponding International Application No. PCT/CN2015/078116, dated Sep. 22, 2015, 19 pages.

(Continued)

*Primary Examiner* — Frantz B Jean
(74) *Attorney, Agent, or Firm* — Arch & Lake LLP

(57) ABSTRACT

A method and an apparatus for pushing information are provided in an intelligent control technology field. In the method, the apparatus obtains a geographic position of at least one target user. The apparatus determines whether a positional relationship between a target user and a monitoring device satisfies a predetermined condition. If the predetermined condition is satisfied, the predetermined condition generates notification information according to monitoring information of the monitoring device; pushing the notification information to devices carried by all or some of the at least one target user. The present disclosure solves the problem of poor monitoring instantaneity and availability in the related art and informs the user of the monitoring information in a form of push notification timely, thus improving the monitoring instantaneity and availability.

18 Claims, 4 Drawing Sheets

(51) Int. Cl.
*G08B 21/02* (2006.01)
*H04W 4/021* (2018.01)
*H04W 4/029* (2018.01)

(52) U.S. Cl.
CPC .......... *G08B 21/0269* (2013.01); *H04L 67/26* (2013.01); *H04W 4/021* (2013.01); *H04W 4/029* (2018.02)

(56) References Cited

U.S. PATENT DOCUMENTS

| | | | |
|---|---|---|---|
| 8,780,201 B1* | 7/2014 | Scalisi | H04N 7/186 |
| | | | 348/143 |
| 2004/0183674 A1* | 9/2004 | Ruvarac | G08B 21/0266 |
| | | | 340/539.13 |
| 2006/0040680 A1 | 2/2006 | Daurensan | |
| 2014/0375800 A1* | 12/2014 | Lim | H04M 1/72538 |
| | | | 348/143 |

FOREIGN PATENT DOCUMENTS

| | | |
|---|---|---|
| JP | H1011674 A | 1/1998 |
| JP | 2005135230 A | 5/2005 |
| JP | 2008310372 A | 12/2008 |
| KR | 20090092900 A | 9/2009 |
| RU | 2523922 C2 | 7/2014 |

OTHER PUBLICATIONS

European Search Report issued in corresponding European Application No. 15199365, dated Mar. 1, 2016, 10 pages.
Notification of Reason for Refusal (including English translation) issued in corresponding Korean Patent Application No. 10-2015-7027011, dated Aug. 17, 2016, 10 pages.
First Office Action (including English translation) issued in corresponding Chinese Patent Application No. 201410768152.6, dated Sep. 26, 2016, 13 pages.
Notification of Reasons for Refusal (including English translation) issued in corresponding Japanese Patent Application No. 2016-563240, dated Feb. 7, 2017, 6 pages.
Notification of Reason for Refusal (including English translation) issued in corresponding Korean Patent Application No. 10-2015-7027011, dated Feb. 24, 2017, 5 pages.
Office Action issued in corresponding Russian Patent Application No. 2015133981112(052254), dated Apr. 28 2017, 7 pages.
EPO Communication issued in corresponding European Patent Application No. 15199365, dated May 11, 2017, 8 pages.
JP Office Action issued in corresponding JP Patent Appllication No. 2016563240, dated Dec. 5, 2017, 6 pages (includes English translation).

* cited by examiner

METHOD AND APPARATUS FOR PUSHING INFORMATION

CROSS-REFERENCE TO RELATED APPLICATIONS

This application is a continuation of International Application No. PCT/CN2015/078116, filed on Apr. 30, 2015, which is based upon and claims priority to Chinese Patent Application No. 201410768152.6, filed with State Intellectual Property Office of P. R. China on Dec. 11, 2014, the entire content of both of which is incorporated herein by reference.

TECHNICAL FIELD

The present disclosure relates to an intelligent control technology field, and more particularly, to a method and an apparatus for pushing information.

BACKGROUND

As an important component of a security and protection system, a monitoring system provides guarantee for people's life safety and property safety.

In daily life, a most common monitoring system usually consists of monitoring cameras. For example, in a home monitoring system, a user may dispose the monitoring cameras at a door of a house and in a room. In a situation that a monitoring mode is turned on, the monitoring cameras may collect video information in a monitoring area and store collected video information in an associated device for the user to consult.

However, the above-described monitoring technology has following problems: in a situation that the user goes out, when abnormal conditions such as a stranger's visiting and an act of theft occur, the user cannot be informed of these abnormal conditions. Even if the user can know the relevant situation by consulting a monitoring record, it is generally too late. Therefore, the above-described monitoring technology has a poor monitoring instantaneity and availability.

SUMMARY

In a first aspect of the present disclosure, there is provided a method for pushing information. The method includes: obtaining a geographic position of at least one target user and determining whether a positional relationship between a target user and a monitoring device satisfies a predetermined condition. If the predetermined condition is satisfied, generating notification information according to monitoring information of the monitoring device, the router may push the notification information to devices carried by all or some of the at least one target user.

In a second aspect of the present disclosure, there is provided an apparatus for pushing information. The apparatus includes: a processor; a memory configured to store an instruction executable by the processor. The processor is configured to: obtain a geographic position of at least one target user; determine whether a positional relationship between a target user and a monitoring device satisfies a predetermined condition; generate notification information according to monitoring information of the monitoring device if the positional relationship satisfies the predetermined condition; and push the notification information to devices carried by all or some of the at least one target user.

In a third aspect of the present disclosure, there is provided a non-transitory computer-readable storage medium having stored therein instructions that, when executed by a processor of a device, causes the device to perform a method for pushing information. The method includes: obtaining a geographic position of at least one target user; determining whether a positional relationship between a target user and a monitoring device satisfies a predetermined condition. If the predetermined condition is satisfied, generating notification information according to monitoring information of the monitoring device; the router may push the notification information to devices carried by all or some of the at least one target user.

In a fourth aspect of the present disclosure, a router is provided. The router includes circuitry configured to obtain a geographic position of at least one target user through a wireless network connection. The router includes circuitry configured to determine whether a positional relationship between a target user and a monitoring device satisfies a predetermined condition. The router includes circuitry configured to generate notification information according to monitoring information of the monitoring device if the positional relationship between the target user and the monitoring device satisfies the predetermined condition The router includes circuitry configured to push the notification information to devices carried by all or some of the at least one target user.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Figure 1:
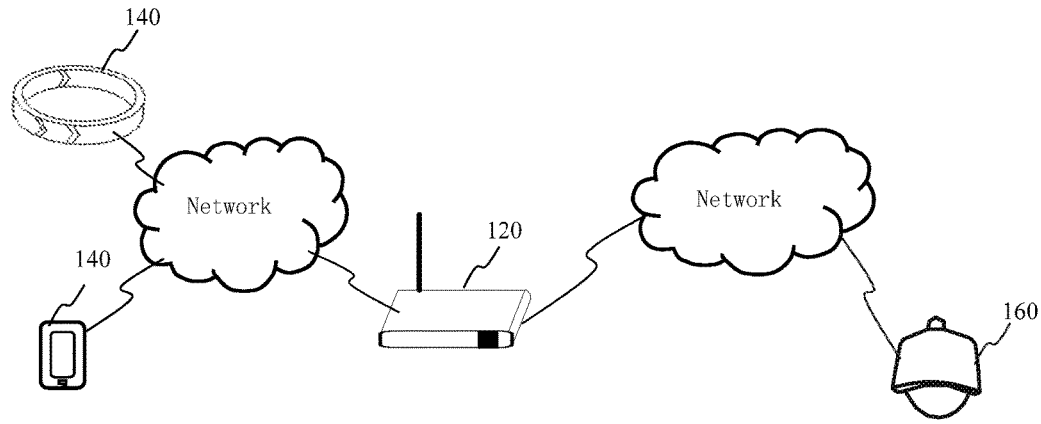
FIG. 1 is a schematic diagram showing an implementing environment according to an exemplary embodiment.

With above drawings, embodiments disclosed by the present disclosure have been presented and detailed descriptions will be provided in the following. These drawings are not intended to limit a scope of the present disclosure in any way, but to interpret an idea of the present disclosure for those skilled in the related art by referring to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

The technology solutions provided by embodiments of the present disclosure have following advantageous effects. By determining whether the positional relationship between a target user and the monitoring device satisfies the predetermined condition according to the geographic position of the target user, generating the notification information according to the monitoring information of the monitoring device if the positional relationship satisfies the predetermined condition, and pushing the notification information to devices carried by all or some of the at least one target user, the problem of the poor monitoring instantaneity and availability in the related art is solved; it may be realized that the user can be informed of the monitoring information in a form of push notification timely, thus improving the monitoring instantaneity and availability.

FIG. 1 is a schematic diagram showing a monitoring system (i.e. the implementing environment) according to an exemplary embodiment. The monitoring system may be a home monitoring system or a commercial monitoring system. The monitoring system may include: a router 120, at least one terminal 140 and at least one monitoring device 160.

The router 120 may be connected to the Internet. The router 140 is connected with the terminal 140 via a network. The router 120 may be connected with the terminal 140 via an external network, and also may be connected with the terminal 140 via an internal network. The terminal 140 may be a mobile terminal such as a mobile phone, a tablet PC, an e-book reader, a personal digital assistant, a portable laptop computer, etc., and also may be a wearable device such as a smart band, a smart watch, a smart helmet, etc.

Similarly, the router 120 is connected with the monitoring device 160 via the network. The router 120 may be connected with the monitoring device 160 via the external network, and also may be connected with the monitoring device 160 via the internal network. The monitoring device 160 may be a camera, a smart doorbell, the smart band and like devices.

Figure 2:
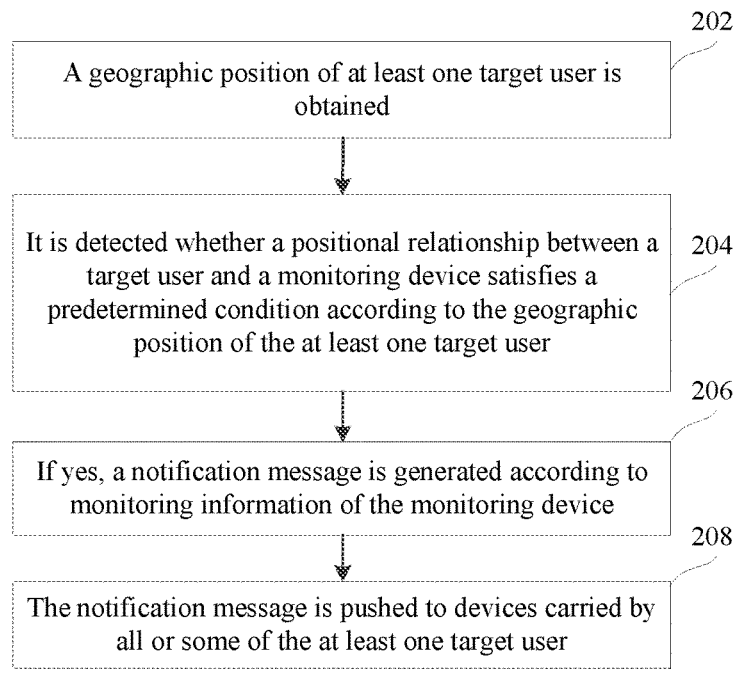
FIG. 2 is a flow chart showing a method for pushing information according to an exemplary embodiment.

FIG. 2 is a flow chart showing a method for pushing information according to an exemplary embodiment, and the embodiment is illustrated by taking an example of applying the method for pushing information to the router of the monitoring system in FIG. 1. The method for pushing information includes following steps.

In step 202, a geographic position of at least one target user is obtained.

In step 204, it is determined whether a positional relationship between a target user and a monitoring device satisfies a predetermined condition.

In step 206, if yes, notification information is generated according to monitoring information of the monitoring device.

In step 208, the notification information is pushed to devices carried by all or some of the at least one target user.

In conclusion, the method for pushing the information provided by the embodiment, by determining whether the positional relationship between a target user and the monitoring device satisfies the predetermined condition according to the geographic position of the target user, generating the notification information according to the monitoring information of the monitoring device if the positional relationship satisfies the predetermined condition, and pushing the notification information to devices carried by all or some of the at least one target user, may solve the problem of poor monitoring instantaneity and availability in the related art; may realize that the user can be informed of the monitoring information in a form of push notification timely, thus improving the monitoring instantaneity and availability.

Figure 3:
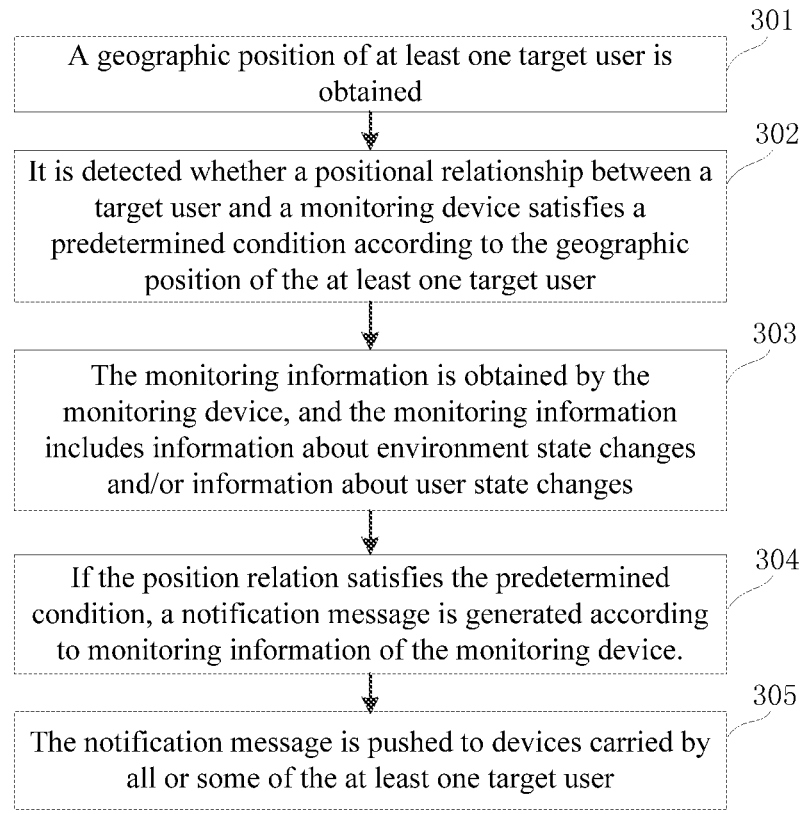
FIG. 3 is a flow chart showing a method for pushing information according to another exemplary embodiment.

FIG. 3 is a flow chart showing a method for pushing information according to another exemplary embodiment, and the embodiment is illustrated by taking an example of applying the method for pushing information to the router of the monitoring system in FIG. 1. The method for pushing information includes following steps.

In step 301, a geographic position of at least one target user is obtained.

The router obtains the geographic position of the at least one target user. The target user is a user who carries a device having a network connection with the router. In a possible application situation, it is assumed that there are two target users, one is a child who is at home alone and wears a smart band; another is parent who is out and carries a mobile phone. The router disposed in the house is connected with the smart band via the internal network, such as a Wi-Fi (Wireless Fidelity) network; the router is connected with the mobile phone via the external network. The router obtains geographic positions of the child and the parent respectively.

In a first example embodiment, the router may obtain the geographic position of a target user according to GPS (Global Positioning System) information of the device carried by the target user. An accurate geographic position can be obtained via the GPS information, such as a specific position of the target user or an exact distance between the target user and the router.

In a second example embodiment, the router may obtain a network connection parameter between itself and the device carried by a target user, and determines the geographic position of the target user according to the network connection parameter. For example, when the router finds that it is connected with a device via the internal network, the router may determine that the geographic position of the target user carrying the device is within a region near itself; or when the router finds that it is connected with a device via the external network, the router may determine that the geographic position of the target user carrying the device is within a region far away from itself. In addition, the network connection parameter may be a signal intensity, a network connection stability and so on. A relatively rough geographic position can be obtained via the network connection parameter, such as an approximate distance between the target user and the router.

In step 302, the router may detect whether a positional relationship between a target user and a monitoring device satisfies a predetermined condition.

A purpose of the router obtaining the geographic position of the target user is to determine whether a target user is within a monitoring area of the monitoring device, i.e., to determine whether the positional relationship between the target user and the monitoring device satisfies the predetermined condition. The predetermined condition is preset according to actual monitoring requirements, and different predetermined conditions may be set according to different monitoring requirements. In the following, combined with actual monitoring requirements, two example embodiments will be illustrated.

In a first example embodiment, step 302 includes following two substeps.

First, if the at least one target user includes a monitored user and a monitoring user, it is detected whether the geographic position of the monitored user and the geographic position of the monitoring user are within a monitoring area of the monitoring device respectively;

Second, it is determined the positional relationship between the target user and the monitoring device satisfies the predetermined condition, if the geographic position of the monitored user is within the monitoring area and the geographic position of the monitoring user is not within the monitoring area.

In the embodiment, the predetermined condition includes that the monitored user is within the monitoring area and the monitoring user is not within the monitoring area, and thus the actual monitoring requirements can be satisfied, such as a safety monitoring of the child at home alone by the parent who go out, or a safety monitoring of the old at home alone by their children who go out.

In a second example embodiment, step 302 includes following two substeps.

First, it is detected whether the geographic position of a target user is within the monitoring area of the monitoring device;

Second, it is determined the positional relationship between the target user and the monitoring device satisfies the predetermined condition, if the geographic position of the target user is not within the monitoring area.

In the embodiment, the predetermined condition includes that the target user is not within the monitoring area, and thus the actual monitoring requirements can be satisfied, such as a safety of a house which is not guarded by anybody, or a safety monitoring of a shop which is not guarded by anybody.

If the positional relationship satisfies the predetermined condition, the router performs step 304 that notification information is generated according to monitoring information of the monitoring device. In addition, before performing step 304, the router first obtains monitoring information by step 303.

In step 303, the monitoring information is obtained by the monitoring device, and the monitoring information includes information about environment state changes and/or information about user state changes.

The information about environment state changes includes at least one of temperature change information, humidity change information, air quality change information, water consumption change information, power consumption change information, gas consumption change information, on-off state information of a device and operation information of a device. Different information about environment state changes are for different actual monitoring requirements, and the monitoring device configured to obtain the information about environment state changes also is different correspondingly. In some example embodiments, if the monitoring device includes a monitoring device provided with a temperature sensor, the monitoring device can obtain the temperature change information in the environment by the temperature sensor and sends the obtained temperature change information to the router; if the monitoring device includes a smart television, the smart television may send the on-off state information of its own to the router; if the monitoring device includes a smart doorbell, the doorbell may send the operation information of its own to the router and so on. For example, taking an example of the smart doorbell, when somebody rings the doorbell, the smart doorbell may send a doorbell triggering notification to the router; correspondingly, the router receives the doorbell triggering notification from the smart doorbell.

In addition, the information about user state changes includes at least one of body temperature change information, heart rate change information, blood pressure change information, and emotion change information. Different information about user state changes are for different actual monitoring requirements, and the monitoring device configured to obtain the information about user state changes also is different correspondingly. One or more biosensors may be disposed in the monitoring device, such as a temperature sensor configured to obtain the body temperature change information, an electro-cardiograph sensor configured to obtain the heart rate change information and an electroencephalogram sensor configured to obtain the emotion change information, etc. The monitoring device may be the wearable device such as the smart band, the smart watch, the smart helmet and like device.

In step 304, if the position relation satisfies the predetermined condition, the router may generate notification information according to monitoring information of the monitoring device. For example, the router may calculate an alert notification by combining all the user state changes including: body temperature change information, heart rate change information, blood pressure change information and emotion change information. The alert notification may include an alert message to be displayed in different colors, where the red color may indicate that the user state changes is over a preset threshold value by a first percentage and a yellow color may indicate that the user state changes is over the preset threshold value by a second percentage but below first percentage. The first percentage may be 50% or higher. The second percentage may be between 20% and 50%.

If the positional relationship between the target user and the monitoring device satisfies the predetermined condition, the router detects whether the obtained monitoring information satisfies a predetermined change condition, if yes, the notification information is generated. The notification information includes, but is not limited to, notification information in a form of text, notification information in a form of audio, notification information in a form of image and notification information in a form of video.

Different predetermined change conditions may be set for different monitoring information by the router. For example, when the monitoring information is the operation information of the doorbell, the corresponding predetermined change condition may be that the doorbell triggering notification is received. Furthermore, when the monitoring information is the body temperature change information, the corresponding predetermined change condition may be that an increase of the body temperature is larger than a predetermined threshold. In an actual application, different predetermined change conditions may be set according to the actual requirements, which can be considered and obtained by those skilled in the related art based on embodiments of the present disclosure and is omitted herein.

Alternatively or additionally, when the notification information is the notification information in a forma of video, step 304 includes following substeps.

First, the router may detect whether the monitoring information satisfies a predetermined change condition.

Second, the router may collect video information using the monitoring device, if the monitoring information satisfies the predetermined change condition.

Third, the router may generate the notification information in a video format according to the video information.

For example, the monitoring device may include a smart doorbell and a camera. When somebody rings the doorbell, the smart doorbell may send the doorbell triggering notification to the router and the camera respectively. Correspondingly, after receiving the doorbell triggering notification from the doorbell, the camera collects the video information in the monitoring area (such as a door area), and sends the collected video information to the router. The router receives the video information from the camera and generates the notification information including the above-described video information.

In step 305, the notification information is pushed to devices carried by all or some of the at least one target user.

After generating the notification information, the router pushes the notification information to devices carried by all or some of the at least one target user. In an example embodiment, when the at least one target user includes a monitored user and a monitoring user, the notification information is pushed to the device carried by the monitoring user. Or, the user may pre-configure a device which is required to receive the push notification in the router, and after generating the notification information, the router pushes the notification information to the device pre-configured by the user.

Alternatively or additionally, the router may pre-set at least two monitoring modes, such as a key monitoring mode and a common monitoring mode. After step 302, the router may further perform following steps: 1. if the positional relationship satisfies the predetermined condition, the current monitoring mode is determined as the key monitoring mode. In the key monitoring mode, the router obtains the monitoring information by the monitoring device and sends the push notification to the user according to the monitoring information. 2. If the positional relationship dissatisfies the predetermined condition, the current monitoring mode is determined as the common monitoring mode. In the common monitoring mode, the router does not obtain the monitoring information of the monitoring device; or the router only stores the monitoring information of the monitoring device, but does not send the push notification to the user.

In conclusion, the method for pushing the information provided by the embodiment, by determining whether the positional relationship between a target user and the monitoring device satisfies the predetermined condition according to the geographic position of the target user, generating the notification information according to the monitoring information of the monitoring device if the positional relationship satisfies the predetermined condition, and pushing the notification information to devices carried by all or some of the at least one target user, may solve the problem of poor monitoring instantaneity and availability in the related art is solved; may realize that the user can be informed of the monitoring information in a form of push notification timely, thus improving the instantaneity and availability of monitoring.

In addition, the method for pushing the information provided by the embodiment, by obtaining the positional relationship between each target user and the monitoring device automatically, further determining whether it is needed to push the notification information to the target user according to the positional relationship, does not need a manual configuration of the user during this process, in which the monitoring system may know the actual monitoring requirement automatically in a view of the geographic position of the target user, may enable the whole monitoring system to adapt to various actual situations and be more automatic and intelligent, thus improving a user' experience greatly.

In addition, the method for pushing the information provided by the embodiment may push the notification information in the form of video to the user, and thus the user can know the condition of the monitoring area more concretely and visually.

In the following, the technology solutions provided by embodiments of the present disclosure will be described and illustrated by taking two actual monitoring requirements as examples.

In a first example, the actual monitoring requirement is that the parent who goes out needs to perform the safety monitoring on the child at home alone. The monitoring system includes the router, the mobile terminal, the smart band, the smart doorbell, and the camera. The mobile terminal is carried by the parent, the smart band is carried by the child and the router is disposed in the house. The router obtains the geographic position of the child by GPS information of the smart band and obtains the geographic position of the parent by GPS information of the mobile terminal. When the router detects that the geographic position of the child is within the monitoring area (for example, in the house) and the geographic position of the parent is not within the monitoring area, it indicates that the current situation is that the child is at home alone and the parent goes out. At this moment, the monitoring system enters into the key monitoring mode. In the key monitoring mode, when somebody rings the smart doorbell, the smart doorbell sends the doorbell triggering notification to the router and the camera respectively. Correspondingly, after receiving the doorbell triggering notification, the router collects the video information in the monitoring area (for example the door area) and sends the collected video information to the router. The router receives the video information from the camera, generates the notification information including the video information and sends the notification information to the mobile terminal of the parent. Correspondingly, the mobile terminal receives and displays the notification information, and further implements a live telecast of the condition in the monitoring area corresponding to the camera for the parent, and thus the parent can know the relevant visiting person timely.

In a second example, the actual monitoring requirement is that the children who go out need to perform the safety monitoring on the old at home alone. In the monitoring system includes the router, the mobile terminal and the smart band. The mobile terminal is carried by the children, the smart band is carried by the old and the router is disposed in the house. The router obtains the geographic position of the old by GPS information of the smart band and obtains the geographic position of the children by GPS information of the mobile terminal. When the router detects that the geographic position of the old is within the monitoring area (for example, in the house) and the geographic position of the children is not within the monitoring area, it indicates that the current situation is that the old is at home alone and the children go out. At this moment, the monitoring system enters into the key monitoring mode. In the key monitoring mode, the electro-cardiograph sensor in the smart band collects the heart rate change information of the old and sends the heart rate change information to the router. When detecting that an extent of the heart rate change is larger than a predetermined value according to the heart rate change information, the router sends the notification information to the mobile terminal so as to inform the children who go out of the relevant condition, such that the children can take corresponding measures timely.

An apparatus embodiment of the present disclosure is shown as following and may be used to execute the method embodiment of the present disclosure. Details undisclosed in the apparatus embodiment of the present disclosure may be referred to the method embodiment of the present disclosure.

Figure 4:
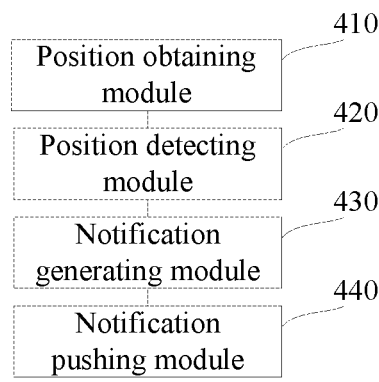
FIG. 4 is a block diagram showing an apparatus for pushing information according to an exemplary embodiment.

FIG. 4 is a block diagram showing an apparatus for pushing information according to an exemplary embodiment, and the apparatus for pushing information may be configured as part or whole of the router in the application situation in FIG. 1 by software, hardware or a combination thereof. The apparatus for pushing the information includes: a position obtaining module 410, a position detecting module 420, a notification generating module 430 and a notification pushing module 440.

The position obtaining module 410 is configured to obtain a geographic position of at least one target user.

The position detecting module 420 is configured to determine whether a positional relationship between a target user and a monitoring device satisfies a predetermined condition. For example, the position detecting module 420 may determine the positional relationship of the target user and the monitoring device according to the geographic position of the at least one target user.

The notification generating module 430 is configured to generate notification information according to monitoring information of the monitoring device if the positional relationship satisfies the predetermined condition.

The notification pushing module 440 is configured to push the notification information to devices carried by all or a part of the at least one target user.

In conclusion, the apparatus for pushing the information provided by the embodiment, by determining whether the positional relationship between the target user and the monitoring device satisfies the predetermined condition according to the geographic position of the target user, generating the notification information according to the monitoring information of the monitoring device if the positional relationship satisfies the predetermined condition, and pushing the notification information to devices carried by all or some of the at least one target user, may solve the problem of poor monitoring instantaneity and availability in the related art is solved; may realize that the user can be informed of the monitoring information in a form of push notification timely, thus improving the instantaneity and availability of monitoring.

Figure 5:
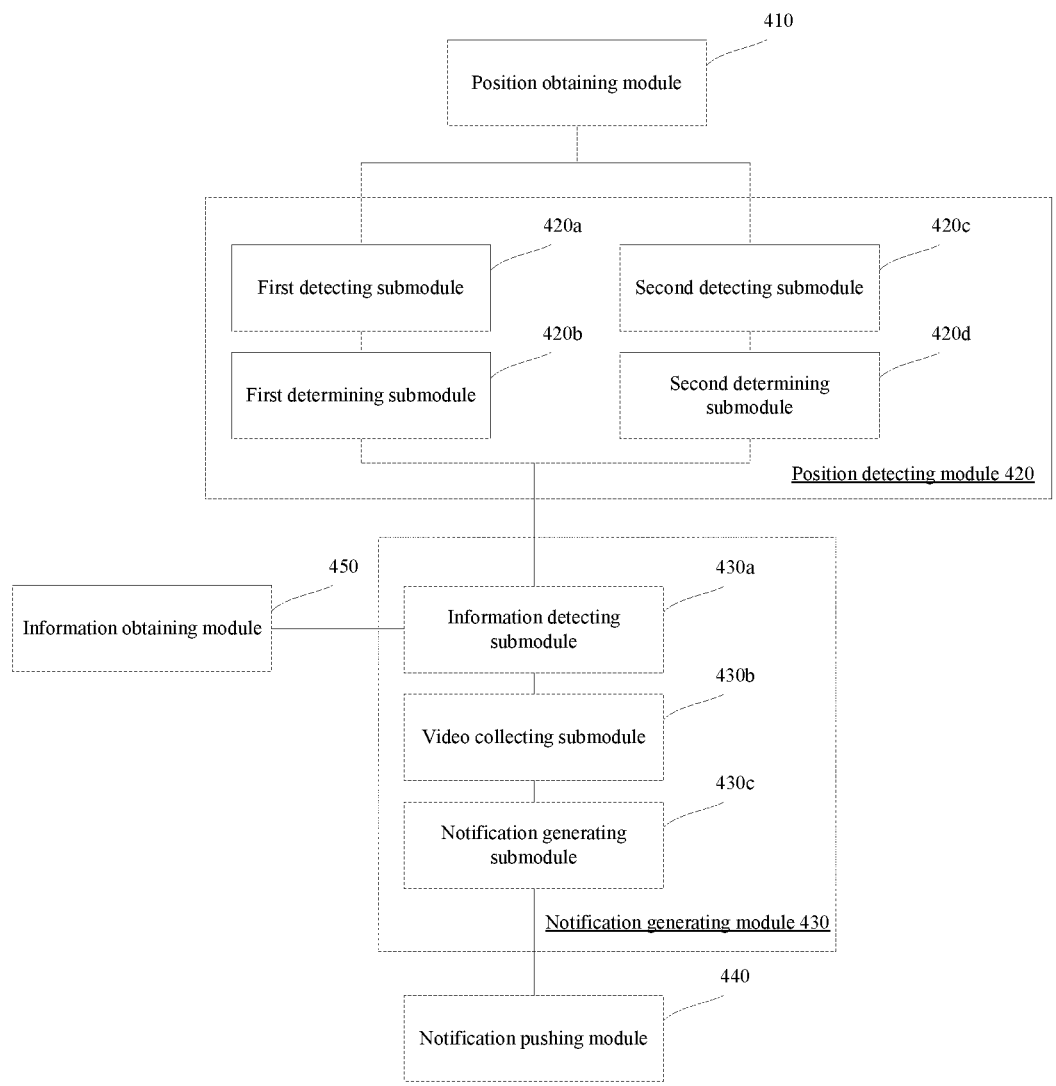
FIG. 5 is a block diagram showing an apparatus for pushing information according to another exemplary embodiment.

FIG. 5 is block diagram showing an apparatus for pushing information according to another exemplary embodiment, and the apparatus for pushing information may be configured as part or whole of the router in the application situation in FIG. 1 by software, hardware or a combination thereof. The apparatus for pushing the information includes: a position obtaining module 410, a position detecting module 420, a notification generating module 430 and a notification pushing module 440.

The position obtaining module 410 is configured to obtain a geographic position of at least one target user.

The position detecting module 420 is configured to determine whether a positional relationship between a target user and a monitoring device satisfies a predetermined condition according to the geographic position of the at least one target user. The position detecting module 420 may determine whether a positional relationship between each target user and a monitoring device satisfies the predetermined condition according to the geographic position of the at least one target user.

In a first example embodiment, the position detecting module 420 includes: a first detecting submodule 420a and a first determining submodule 420b.

The first detecting submodule 420a is configured to determine whether the geographic position of a monitored user and the geographic position of a monitoring user are within a monitoring area of the monitoring device respectively, if the at least one target user comprises the monitored user and the monitoring user.

The first determining submodule 420b is configured to determine the positional relationship between the target user and the monitoring device satisfies the predetermined condition, if the geographic position of the monitored user is within the monitoring area and the geographic position of the monitoring user is not within the monitoring area.

In a second example embodiment, the position detecting module 420 includes: a second detecting submodule 420c and a second determining submodule 420d.

The second detecting submodule 420c is configured to determine whether the geographic position of the target user is within the monitoring area of the monitoring device.

The second determining submodule 420d is configured to determine the positional relationship between each target user and the monitoring device satisfies the predetermined condition, if the geographic position of the target user is not within the monitoring area.

The notification generating module 430 is configured to generate notification information according to monitoring information of the monitoring device if the positional relationship satisfies the predetermined condition;

Alternatively or additionally, the notification generating module 430 includes: an information detecting submodule 430a, a video collecting submodule 430b and a notification generating submodule 430c.

The information detecting submodule 430a is configured to determine whether the monitoring information satisfies a predetermined change condition.

The video collecting submodule 430b is configured to collect video information by the monitoring device, if the monitoring information satisfies the predetermined change condition.

The notification generating module 430c is configured to generate the notification information in a form of video according to the video information.

The notification pushing module 440 is configured to push the notification information to devices carried by all or a part of the at least one target user.

Alternatively or additionally, the notification pushing module 440 is further configured to push the notification information to a device carried by a monitoring user if the at least one target user comprises a monitored user and the monitoring user.

Alternatively or additionally, the apparatus further includes an information obtaining module 450. The information obtaining module 450 is configured to obtain the monitoring information by the monitoring device, the monitoring information includes information about environment state changes and/or user state changes;

The information about the environment state changes includes at least one of temperature change information, humidity change information, air quality change information, water consumption change information, power consumption change information, gas consumption change information, on-off state information of a device and operation information of a device; the information about user state changes includes at least one of body temperature change information, heart rate change information, blood pressure change information and emotion change information.

In conclusion, the apparatus for pushing the information provided by the embodiment, by determining whether the positional relationship between a target user and the monitoring device satisfies the predetermined condition according to the geographic position of the target user, generating the notification information according to the monitoring information of the monitoring device if the positional relationship satisfies the predetermined condition, and pushing the notification information to devices carried by all or some of the at least one target user, may solve the problem of poor monitoring instantaneity and availability in the related art is solved; may realize that the user can be informed of the monitoring information in a form of push notification timely, thus improving the instantaneity and availability of monitoring.

In addition, the apparatus for pushing the information provided by the embodiment, by obtaining the positional relationship between the target user and the monitoring device automatically, further determining whether it is needed to push the notification information to the target user according to the positional relationship, does not need a manual configuration of the user during this process, in which the monitoring system may know the actual monitoring requirement automatically in a view of the geographic position of the target user, may enable the whole monitoring system to adapt to various actual situations and be more automatic and intelligent, thus improving a user's experience greatly.

In addition, the apparatus for pushing the information provided by the embodiment may push the notification information in the form of video to the user, and thus the user can know the condition of the monitoring area more concretely and visually.

With respect to the apparatuses in the above embodiments, the specific manners for performing operations for individual modules therein have been described in detail in the embodiments regarding the methods for pushing the information, which will not be elaborated herein.

Figure 6:
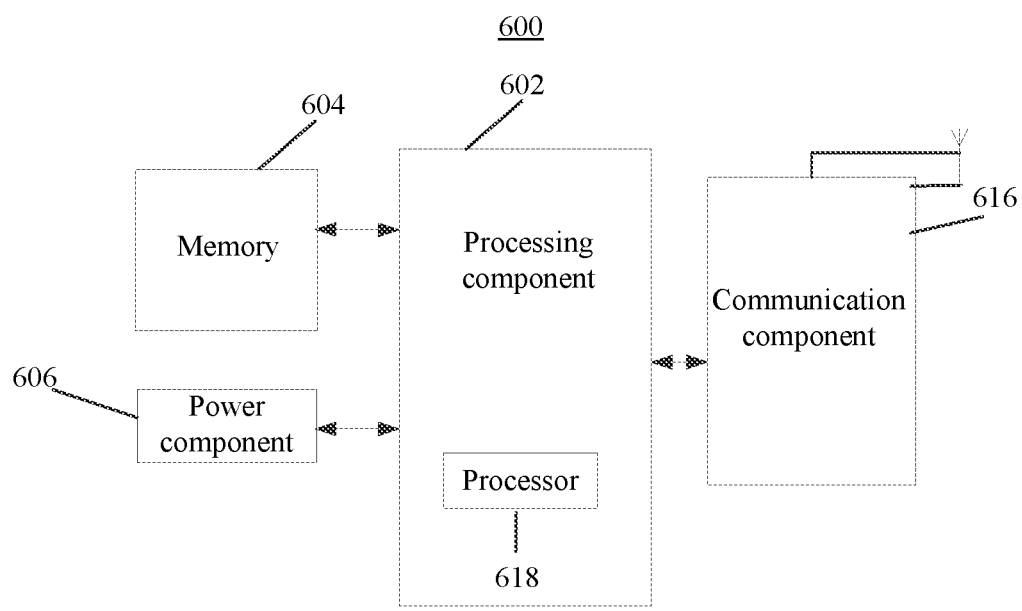
FIG. 6 is a block diagram showing an apparatus according to an exemplary embodiment.

FIG. 6 is a block diagram showing an apparatus according to an exemplary embodiment. For example, the apparatus 600 may be a router.

With reference to FIG. 6, the apparatus 600 may include one or more of following components: a processing component 602, a memory 604, a power component 606 and a communication component 616.

The processing component 602 typically controls overall operations of the apparatus 600, such as address resolution operations, data reception-transmission operations and flow control operations. The processing component 602 may include one or more processors 618 to execute instructions to perform all or some of the steps in the above-described methods. Moreover, the processing component 602 may include one or more modules which facilitate the interaction between the processing component 602 and other components.

The memory 604 is configured to store various types of data to support the operation of the apparatus 600. Examples of such data include instructions and user data for any applications or methods operated on the apparatus 600. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk. The memory 604 further includes one or more modules, which are configured to to be executed by one or more processors 618 to implement all or some of steps in the methd shown in FIG. 2 or 3.

The power component 606 provides power to various components of the apparatus 600. The power component 606 may include a power management system, one or more power sources, and any other components associated with the generation, management, and distribution of power in the apparatus 600.

The communication component 616 is configured to facilitate communication, wired or wirelessly, between the apparatus 600 and other devices. The apparatus 600 can access a wireless network based on a communication standard, such as WiFi. In one exemplary embodiment, the communication component 616 sends a broadcast signal or broadcast associated information to the exterior via a broadcast channel.

In exemplary embodiments, the apparatus 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 604, executable by the processor 618 in the apparatus 600, for performing the above-described methods. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims. The different exemplary embodiments in the disclosure may be combined to create new embodiment not within undue experiments by a person having ordinary skill in the art.

It will be appreciated that the present disclosure is not limited to the exact construction that has been described above and illustrated in the accompanying drawings, and that various modifications and changes can be made not within departing from the scope thereof. It is intended that the scope of the disclosure only be limited by the appended claims.

What is claimed is:

1. A method for pushing information performed by a router, wherein the router is configured to be connected to a monitoring device, and the method comprises:
    obtaining a geographic position of at least one target user who carries a device having a network connection with the router;
    determining whether a positional relationship between the at least one target user and the monitoring device satisfies a predetermined condition;
    when the predetermined condition is satisfied, determining that a current monitoring mode is a key monitoring mode, generating notification information according to monitoring information of the monitoring device;
    pushing the generated notification information to a device pre-configured to receive the notification information; and
    when the predetermined condition is not satisfied, determining that the current monitoring mode is a common monitoring mode, storing the monitoring information collected by the monitoring device.

2. The method according to claim 1, wherein the at least one target user comprises one first target user and a second target user, determining whether the positional relationship between the at least one target user and the monitoring device satisfies a predetermined condition comprises:
    determining whether the geographic position of the first target user and the geographic position of a monitoring user are respectively within a monitoring area of the monitoring device, and whether the geographic position of the second target user is beyond the monitoring area of the monitoring device;
    determining the positional relationship between the at least one target user and the monitoring device satisfies the predetermined condition, when the geographic position of the first target user is within the monitoring area and the geographic position of the second target user is not within the monitoring area.

3. The method according to claim 1, wherein determining whether the positional relationship between the at least one target user and the monitoring device satisfies a predetermined condition comprises:
    determining whether the geographic position of each of the at least one target user is within a monitoring area of the monitoring device;
    determining the positional relationship between the at least one target user and the monitoring device satisfies the predetermined condition, when the geographic position of each of the at least one target user is not within the monitoring area.

4. The method according to claim 1, further comprising:
    obtaining by the monitoring device the monitoring information, the monitoring information comprising information about environment state changes and/or information about user state changes;
    wherein the information about environment state changes comprises at least one of: temperature change information, humidity change information, air quality change information, water consumption change information, power consumption change information, gas consumption change information, on-off state information of a device, and operation information of a device; and
    wherein the information about user state changes comprises at least one of: body temperature change information, heart rate change information, blood pressure change information, and emotion change information.

5. The method according to claim 1, wherein generating notification information according to monitoring information of the monitoring device comprises:
    determining whether the monitoring information satisfies a predetermined change condition;
    collecting, by the monitoring device, video information if the monitoring information satisfies the predetermined change condition; and
    generating the notification information in a form of video according to the video information.

6. The method according to claim 1, wherein pushing the notification information to devices carried by all or some of the at least one target user comprises:
    if the at least one target user comprises a monitored user and a monitoring user, pushing the notification information to a device carried by the monitoring user.

7. An apparatus for pushing information, wherein the apparatus is configured to be connected to a monitoring device, and comprises:
    a processor;
    a memory configured to store an instruction executable by the processor;
    wherein the processor is configured to:
    obtain a geographic position of at least one target user who carries a device having a network connection with the apparatus;
    determine whether a positional relationship between the at least one target user and the monitoring device satisfies a predetermined condition;
    determining that a current monitoring mode is a key monitoring mode, generate notification information according to monitoring information of the monitoring device when the positional relationship satisfies the predetermined condition;
    pushing the generated notification information to a device pre-configured to receive the notification information; and
    when the predetermined condition is not satisfied, determining that the current monitoring mode is a common monitoring mode, storing the monitoring information collected by the monitoring device.

8. The apparatus according to claim 7, wherein the at least one target user comprises one first target user and a second target user, the processor is configured to determine whether the positional relationship between the at least one target user and the monitoring device satisfies a predetermined condition by acts comprising:
    determining whether the geographic position of the first target user and the geographic position of a monitoring user are within a monitoring area of the monitoring device respectively, and whether the geographic position of the second target user is beyond the monitoring area of the monitoring device; and determining the positional relationship between the at least one target user and the monitoring device satisfies the predetermined condition, when the geographic position of the first target user is within the monitoring area and the geographic position of the second target user is not within the monitoring area.

9. The apparatus according to claim 7, wherein the processor is configured to determine whether the positional relationship between the at least one target user and a monitoring device satisfies a predetermined condition by acts comprising:

determining whether the geographic position of each of the at least one target user is within a monitoring area of the monitoring device; and determining the positional relationship between the at least one target user and the monitoring device satisfies the predetermined condition, if the geographic position of each of the at least one target user is not within the monitoring area.

10. The apparatus according to claim 7, wherein the processor is further configured to:

obtain by the monitoring device the monitoring information, the monitoring information comprising information about environment state changes and/or information about user state changes;

wherein, the information about environment state changes comprises at least one of: temperature change information, humidity change information, air quality change information, water consumption change information, power consumption change information, gas consumption change information, on-off state information of a device, and operation information of a device; and wherein the information about user state changes comprises at least one of: body temperature change information, heart rate change information, blood pressure change information, and emotion change information.

11. The apparatus according to claim 7, wherein the processor is configured to generate notification information according to monitoring information of the monitoring device by acts comprising:

determining whether the monitoring information satisfies a predetermined change condition;

collecting, by the monitoring device, video information if the monitoring information satisfies the predetermined change condition; and generating the notification information in a form of video according to the video information.

12. The apparatus according to claim 7, wherein the processor is configured to push the notification information to devices carried by all or some of the at least one target user by a step of:

if the at least one target user comprises a monitored user and a monitoring user, pushing the notification information to a device carried by the monitoring user.

13. A router configured to be connected to a monitoring device, and comprising:

circuitry configured to obtain a geographic position of at least one target user who carries a device having a network connection with the router through a wireless network connection;

circuitry configured to determine whether a positional relationship between the at least one target user and a monitoring device satisfies a predetermined condition;

circuitry configured to determine that a current monitoring mode is a key monitoring mode, generate notification information according to monitoring information of the monitoring device when the positional relationship between the target user and the monitoring device satisfies the predetermined condition; and circuitry configured to push the generated notification information to a device pre-configured to receive the notification information, and determine that the current monitoring mode is a common monitoring mode, storing the monitoring information collected by the monitoring device when the predetermined condition is not satisfied, wherein the monitoring information comprises following information related to the target user: body temperature change information, heart rate change information, blood pressure change information, and emotion change information.

14. The router according to claim 13, wherein the at least one target user comprises one first target user and a second target user, and the router further comprises:

circuitry configured to determine whether the geographic position of the first target user and the geographic position of the monitoring user are within a monitoring area of the monitoring device respectively, and whether the geographic position of the second target user is beyond the monitoring area of the monitoring device; and circuitry configured to determine the positional relationship between the at least one target user and the monitoring device satisfies the predetermined condition, when the geographic position of the first target user is within the monitoring area and the geographic position of the second target user is not within the monitoring area.

15. The router according to claim 13, further comprising:

circuitry configured to determining whether the geographic position of each of the at least one target user is within a monitoring area of the monitoring device; and circuitry configured to determine the positional relationship between each of the at least one target user and the monitoring device satisfies the predetermined condition, when the geographic position of the target user is not within the monitoring area.

16. The router according to claim 13, further comprising:

circuitry configured to obtain by the monitoring device the monitoring information, the monitoring information comprising information about environment state changes and/or information about user state changes;

wherein the information about environment state changes comprises at least one of: temperature change information, humidity change information, air quality change information, water consumption change information, power consumption change information, gas consumption change information, on-off state information of a device, and operation information of a device.

17. The router according to claim 13, further comprising:

circuitry configured to determine whether the monitoring information satisfies a predetermined change condition;

circuitry configured to collect video information if the monitoring information satisfies the predetermined change condition; and circuitry configured to generate the notification information in a form of video according to the video information.

18. The router according to claim 13, further comprising:
   circuitry configured to push the notification information to a device carried by the monitoring user if the at least one target user comprises a monitored user and a monitoring user.

* * * * *